United States Patent [19]

Sobanski

[11] 3,944,750

[45] Mar. 16, 1976

[54] CIRCUITRY FOR PROVIDING CALL OVERRIDE IN A PBX SYSTEM

[75] Inventor: Edward Walter Sobanski, Boulder, Colo.

[73] Assignee: Western Electric Company, New York, N.Y.

[22] Filed: Oct. 3, 1974

[21] Appl. No.: 511,752

[52] U.S. Cl.............................................. 179/18 BH
[51] Int. Cl.² .......................................... H04M 3/20
[58] Field of Search............ 179/18 B, 18 BH, 27 FE

[56] References Cited
UNITED STATES PATENTS

| | | | |
|---|---|---|---|
| 2,444,033 | 6/1948 | Cohrt................................. | 179/18 H |
| 2,823,264 | 2/1958 | Pharis............................... | 179/18 BH |

*Primary Examiner*—William C. Cooper
*Attorney, Agent, or Firm*—C. S. Phelan

[57] ABSTRACT

In a telephone switching system wherein a plurality of line circuits are terminated in station sets, the line circuits are interconnectable to a plurality of trunk circuits through a multistage switching network. A call originated by a calling party to a called party, engaged in a conversation with a third party, is completed by overriding the conversation between the called party and the third party provided the calling party is equipped with a class of service which permits call override. Call override is initiated by the calling party upon receipt of a busy tone by a flashing of his switchhook.

13 Claims, 4 Drawing Figures

3,944,750

CIRCUITRY FOR PROVIDING CALL OVERRIDE IN A PBX SYSTEM

BACKGROUND OF THE INVENTION

1. Field of the Invention

This invention relates to *Private Branch Exchange* (PBX) switching systems and, in particular, to circuitry for providing call override or butt-in capability.

2. Description of the Prior Art

In prior art PBX systems the ability of a calling party to override a conversation between a called party and a third party required the calling party, upon receipt of a busy tone, to hang up and then dial a special override code followed by the directory number of the busy called party. One of the disadvantages in implementing call override in this manner is that the calling party must first hang up upon receipt of the busy tone. Another disadvantage is that special circuitry must be provided in the PBX to recognize the special code required to initiate a call override sequence. A third disadvantage is that the calling party must redial the directory number of the busy called party once the PBX system has been alerted that a call override request has been made. These disadvantages make the provision of call override expensive in both the amount of time required to effect an override and in the amount of equipment needed to supply this feature.

Accordingly, it is one object of the present invention to reduce the amount of time expended by a calling party in effecting a call override to a busy called party.

Another object is to eliminate the need for the calling party to redial the directory number of the busy called party.

A further object of the present invention is to reduce the amount of PBX system equipment required to provide a call override feature.

Yet another object is to eliminate the need for the calling party to first hang up and then dial a special call override code.

SUMMARY OF THE INVENTION

These and other objects of the invention are realized in accordance with an illustrative embodiment of a telephone switching system having a plurality of line circuits terminated in station sets wherein the line circuits are interconnectable to a plurality of trunk circuits through a multistage switching network. Any calling station is able to override a connection between a busy called station and a third party station provided the calling station is supplied with a class of service which permits call override. Detection of a class of service indication providing for call override causes a call override trunk to be seized upon a marker receiving an indication that the called station is busy. Actuation of the call override sequence is initiated by a switchhook flash at the calling station.

Accordingly, it is one feature of the present invention that a connection is established through the network from a calling station to a call override trunk and through the network from the call override trunk to a called station in response to the detection of a busy condition of the called station and a predetermined class of service of the calling station.

Another feature is that a switchhook flash by the calling station following the receipt of busy tone is recognized as an override signal by the override trunk and enables the trunk thereby establishing a call override connection between the calling station and the busy called station.

A further feature of the present invention is that a ringing signal is supplied to the called station if the called station goes idle before switchhook flash by the calling station.

Yet another feature is that a call override warning signal is supplied to the calling station, the called station and the third party station prior to cut through of the call override connection.

Still another feature is that talk battery supervision is provided to both the calling and called stations by the override trunk.

DESCRIPTION OF THE DRAWINGS

These and other objects and features of the invention will become more apparent upon consideration of the following detailed description and appended claims in connection with the attached drawings of an illustrative embodiment in which:

FIG. 4 is placed adjacent to the bottom of FIG. 3, is an illustrative embodiment of an override trunk circuit.

DETAILED DESCRIPTION

Figure 2:
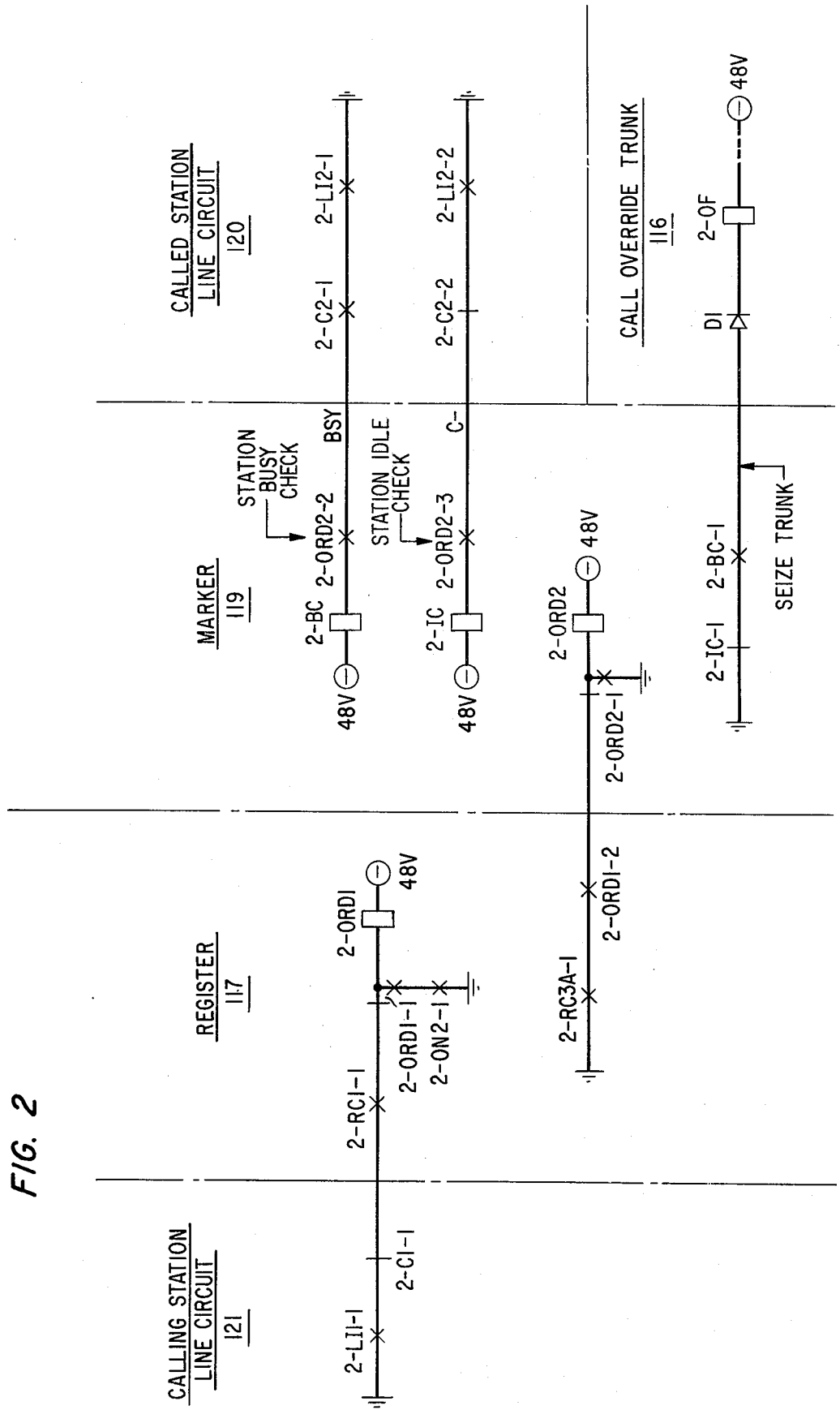
FIG. 2 is a detached contact schematic illustrating the manner in which an override trunk is seized.
Figure 3:
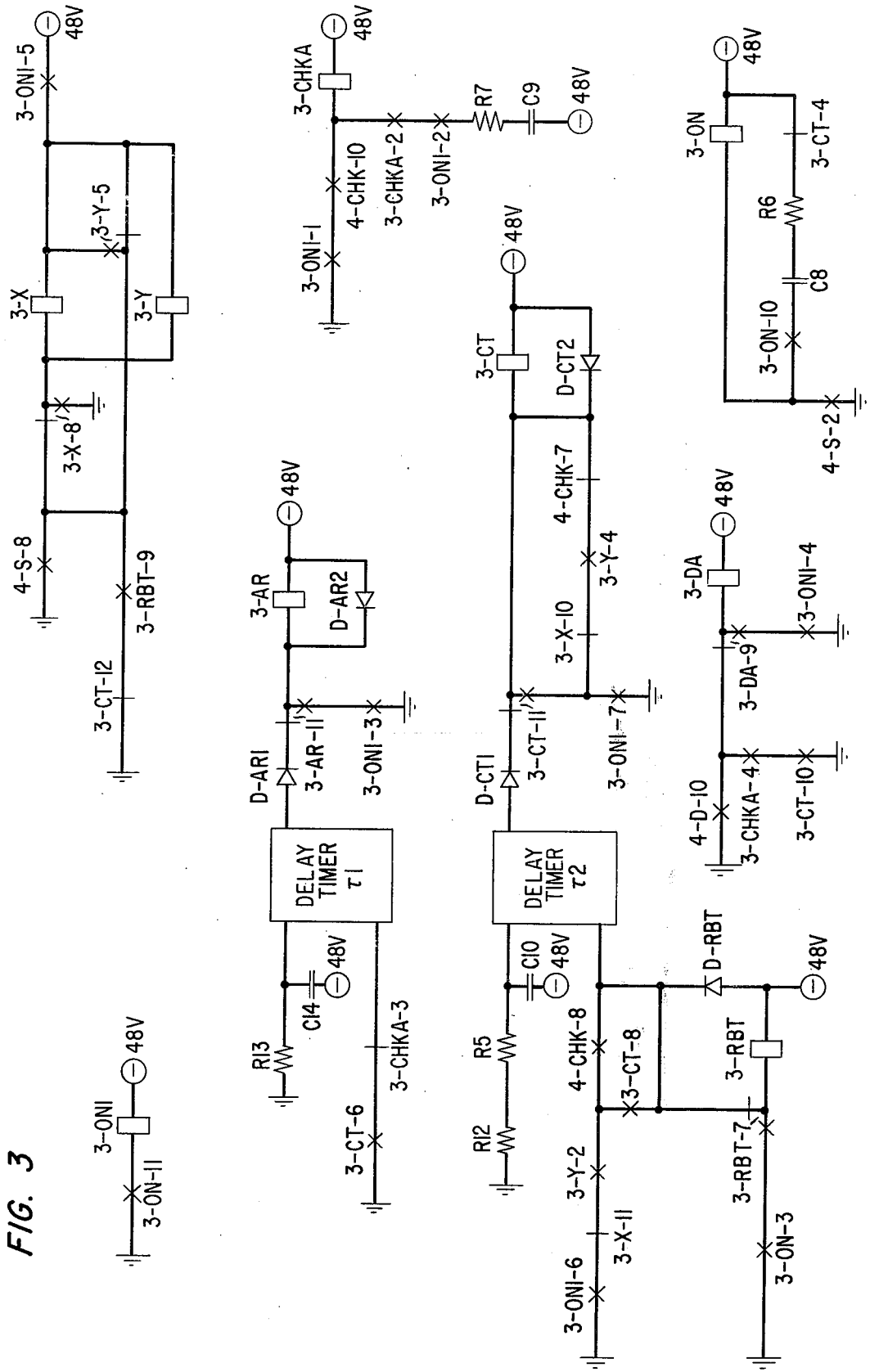
FIGS. 3 and 4, when
Figure 4:
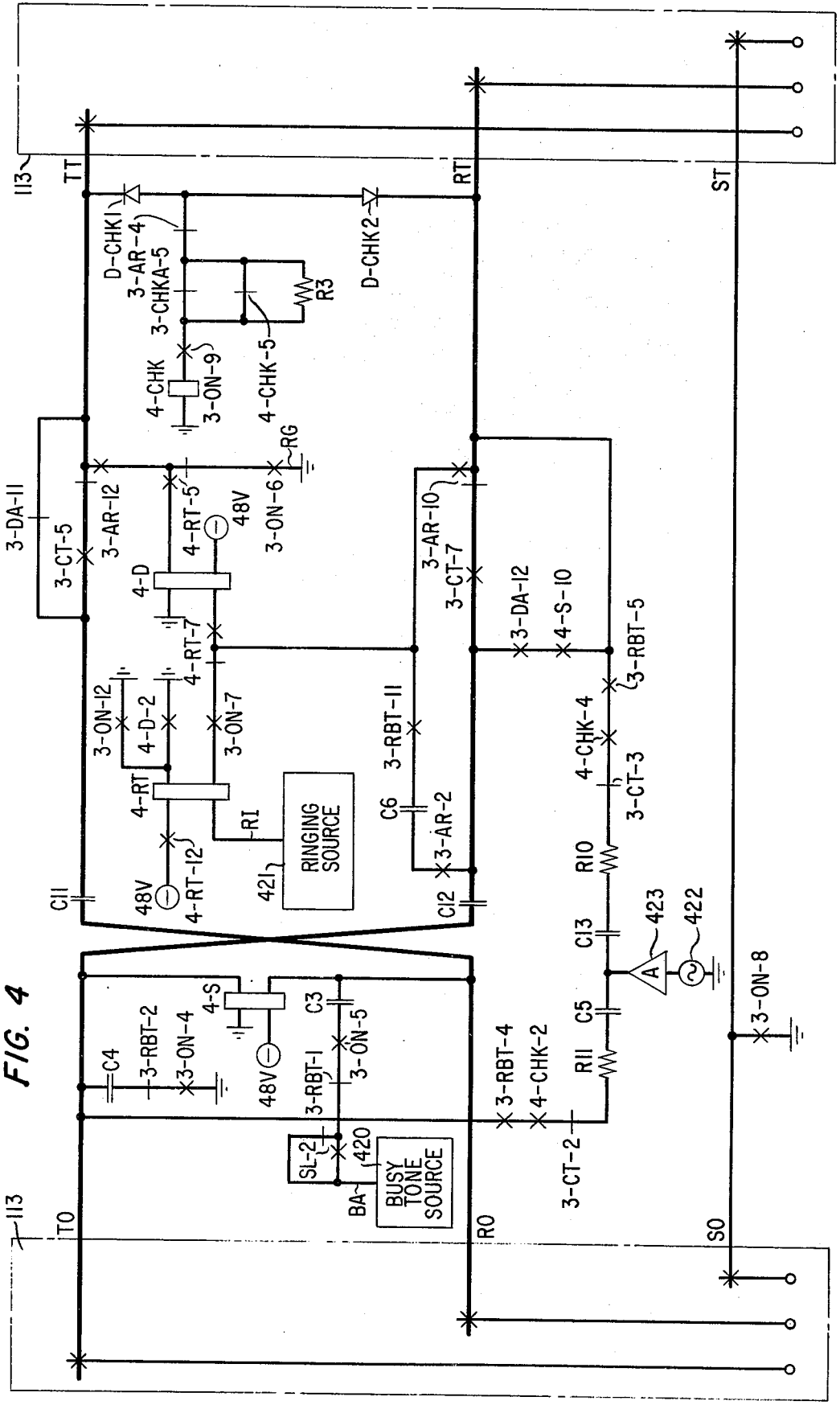

It should be noted that FIGS. 2 through 4 employ a type of notation referred to as "detached contact" in which an "X", shown intersecting a conductor, represents a normally open contact of a relay and a bar, shown intersecting a conductor at right angles, represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the AMERICAN INSTITUTE OF THE ELECTRICAL ENGINEERS TRANSACTIONS, COMMUNICATIONS AND ELECTRONICS, Vol. 74, pages 505–513.

It should be noted also that in order to simplify the disclosure and thus facilitate a more complete understanding of the embodiment, relays, relay contacts and other electromechanical devices, shown in FIGS. 2 through 4, have been given systematic designations. Thus, the number preceding the letter designation of each device corresponds to the figure in which the control circuit of the device is shown. For example, the control circuit for relay BC is shown in FIG. 2, and therefore, is referred to as 2-BC. Each relay contact, whether make, break or transfer, is shown with its specific contact number preceded by the designation of the relay to which it belongs. As an example, the notation 3-X-8 indicates contact number 8 of the X relay, the control circuit of which is shown in FIG. 3.

1.1. General Description

Figure 1:
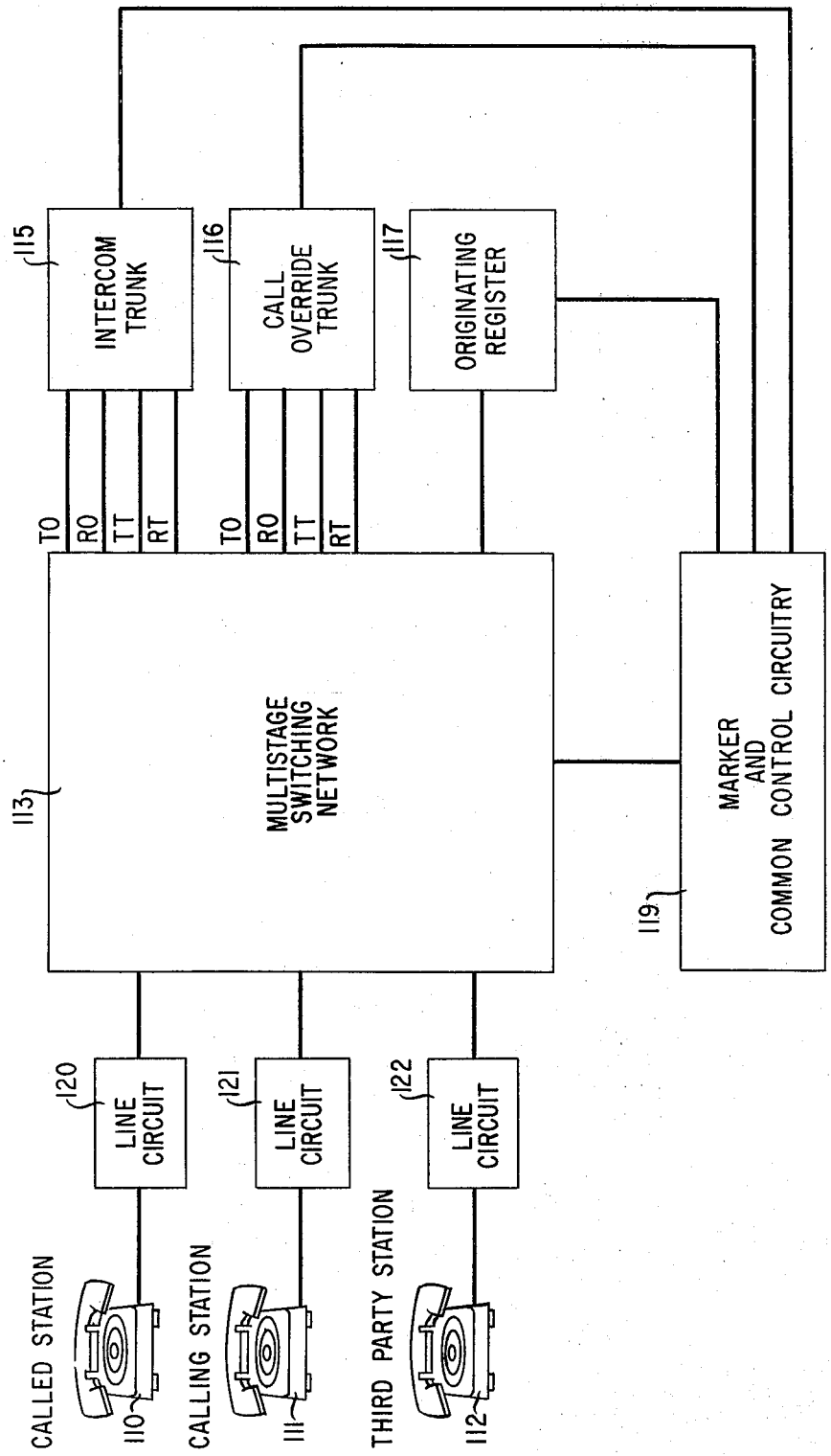
FIG. 1 is a generalized schematic representation of a network connection for providing call override.

Before a call override feature takes on any significance there must be a connection between a called station 110, as shown in FIG. 1, and a third party station 112. This interconnection is effected through an intercom trunk 115 and a multistage switching network 113 operating under the control of a marker 119 in a manner, for example, similar to that set out at column 18 et seq. of H. H. Abbott et al. U.S. Pat. No. 2,949,506 issued Aug. 16, 1960. It should be noted that the called station 110, a calling station 111 and the third party station 112 are connected to the multistage switching network 113 through line circuits 120, 121 and 122, respectively.

When the calling station 111 attempts to place a similar call to called station 110, a busy tone is returned to the calling station 111 because of the prior connection of the called station 110 to the third party station 112. If the calling station 111 is provided with a class of service which allows call override, the calling station 111, upon detection of the busy condition by the marker 119, is connected to an override trunk circuit 116. Ascertainment of whether the calling station 111 has the requisite class of service to allow call override is effected by class of service check circuitry which is partially located in an originating register 117 and partially located in the marker 119. An example of the manner in which this class of service check may be made is set out in A. Zarouni U.S. Pat. No. 3,141,931 issued July 21, 1964.

Following connection of the calling station 111 to the override trunk circuit 116, a request for implementation of the call override feature is made by a flashing of the switchhook of the calling station 111. Upon receipt of the switchhook flash signal the override trunk circuit 116 is connected to the called station 110. Just prior to completion of a talking path between the calling station 111 and the called station 110 a three second tone is supplied to all stations which are still part of the connection, that is, the called station 110, the calling station 111 and the third party station 112. At the end of this three second tone a talking path between the calling station 111 and the called station 110 is completed, regardless of the action taken at the third party station 112. If the called station 110 goes idle after the switchhook flash by the calling station 111 but prior to receiving the three second tone, a ringing signal is supplied to the called station 110 to alert it that an incoming call is being made.

1.2. Class of Service Check

Call override capability is provided only to those calling stations 111 which have been supplied with a class of service which permits call override. A check of the call override class of service is effected by circuitry of the type shown in FIG. 2. When a calling station 111 goes offhook, a switchhook contact (not shown) is closed. This contact closure activates a line relay, similar to line relay L30 shown in FIG. 35 of the aforementioned Abbott et al. patent, in line circuit 121 and provides a service request indication to marker 119, as shown in FIG. 1, for an idle register of the type illustrated by originating register 117. All of the foregoing actions occur whenever a calling station 111 in a PBX system goes off-hook, as set out in the previously mentioned Abbott et al. patent, and are included in this description only for purposes of illustrating how an idle register 117 is seized for calling station 111.

With the marker 119 having found an idle register 117, the class of service of the calling station 111 is forwarded to the register 117 and, in turn, is passed to the marker 119. An illustration of how the class of service information is routed to the marker 119 is shown in FIG. 2 in simplified form. Routing of the class of service is effected by supplying a ground potential to one side of a 2-ORD1 class of service detection relay, the other side of which is held at a battery potential of −48 volts. The ground potential to operate the 2-ORD1 relay is supplied through a normally open contact 2-LI1-1 of a line identification relay, a normally closed contact 2-C1-1 of a line cutoff relay, a normally open contact 2-RC1-1 of a register connect relay, and a normally closed contact 2-ORD1-1 of the class of service detection relay 2-ORD1. It should be noted that the line identification relay, the line cutoff relay, and the register connect relay are utilized in any type of PBX connection and are included in this description for illustrative purposes only since they form no essential part of the present invention.

Operation of the 2-ORD1 relay is locked by a ground path through a normally open contact 2-ORD1-1 and a normally open contact 2-ON2-1 of an off normal relay. Actuation of the 2-ORD1 relay causes the class of service indication to be passed to the originating register 117. At this point dial tone is received and the calling station 111 dials the directory number of the called station 110.

1.3. Busy/Idle Check of Called Station

When the directory number of the called station 110 has been dialed, a dial complete bid is forwarded from the register 117 to the marker 119. The dial complete bid recalls the marker 119 in order to perform a busy/idle check of the called station 110. Busy verification checks are well documented in the prior art of which the E. L. Erwin et al. U.S. Pat. No. 3,410,960 issued Nov. 12, 1968 is an example. Accordingly, only a simplified version is included in the present disclosure for illustration purposes.

Recall of the marker 119 is effected by providing a ground potential through a normally open contact 2-RC3A-1 of a register complete relay, a normally open contact 2-ORD1-2 of the 2-ORD1 relay, and a normally closed contact 2-ORD2-1 of a 2-ORD2 relay. With the marker 119 recalled the override class of service indication is forwarded to it by actuation of the 2-ORD2 relay. For similar reasons to those noted above with regard to the line identification relay, the control circuit for the register complete relay need not be shown since it merely controls the gating of any and all information from the register 117 to the marker 119 and, hence, forms no essential part of the present invention.

It should be recalled that actuation of the 2-ORD1 relay caused the normally open contact 2-ORD1-2 to close with the result that a ground potential is applied to one side of the 2-ORD2 relay. With the opposite side of the 2-ORD2 relay held at a battery potential of -48 volts, the relay operates and is held operated by application of a ground potential through a normally open contact 2-ORD2-1 of the 2-ORD2 relay.

Having recalled the marker 119 the busy/idle check of the called station 110 connected to line circuit 120 is implemented by checking the status of a busy check relay 2-BC and an idle check relay 2-IC. The busy check relay 2-BC is actuated if the called station 110 is busy since a ground potential will be provided to one side of the 2-BC relay, the other side of which is held at a battery potential of −48 volts. The ground to operate the 2-BC relay is supplied through normally open contacts 2-LI2-1, 2-C2-1, and 2-ORD2-2, respectively.

If the called station 110 is busy, both its line identification relay and line cutoff relay will have been actuated with the result that the normally open contacts 2-LI2-1 and 2-C2-1 will be closed. Closure of these contacts coupled with closure of the 2-ORD2-2 contact of the 2-ORD2 relay actuates the 2-BC relay. If the called station 110 is idle, its line cutoff relay will not be actuated. Consequently, normally closed contact 2-C2-2 remains closed and a ground potential to operate the idle check relay 2-IC is supplied from the called station 110 through a normally open contact 2-LI2-2 of its line identification relay, the normally closed contact 2-C2-2 of its line cutoff relay, and a normally open contact 2-ORD2-3 of the 2-ORD2 relay.

1.4. Override Trunk Circuit Seizure

Following the busy/idle check the marker 119 will either seize the call override trunk 116 if the called station 110 is busy, or, if the called station 110 is idle, the intercom trunk 115 will be seized to complete the connection. This latter connection is of no further interest in this context and will not be pursued farther.

For the situation wherein the called station 110 is busy, the 2-BC relay is actuated causing a normally open contact 2-BC-1 to close. In addition, if the called station 110 is busy, the idle check relay 2-IC iss not actuated and its normally closed contact 2-IC-1 remains closed. With the states of these two relays being as noted, a ground potential is applied to the override trunk 116 through a line protection diode D1 to a 2-OF relay thereby actuating it and seizing the trunk.

1.5. Path Completion to Calling Station

Subsequent action by marker 119 results in an idle path through the multistage switching network 113 being selected and a signaling path being completed to the calling station 111. Completion of this path subjects the calling station 111 to the control of a supervisory relay 4-S, as shown in FIG. 4. Actuation of the supervisory relay 4-S is effected by completion of a loop through the calling station 111 via a ring lead RO and a tip lead TO. The operation of relay 4-S via the tip and ring crosspoint connection to the calling station loop provides talking battery to the calling station 111.

In addition to the foregoing, operation of relay 4-S causes an off normal relay 3-ON, shown in FIG. 3, to be actuated by application of ground through a normally open contact 4-S-2. Operation of relay 3-ON closes a normally open contact 3-ON-10 closing a resistive-capacitive slow release loop around relay 3-ON. The resistive-capacitive loop is comprised of a resistor R6 and a capacitor C8 which had values of 1500 ohms and 200 microfarads, respectively. A normally closed contact 3-CT-4 is included in the slow release loop for disabling it during other operations of relay 3-ON.

1.6. Path Completion Through Override Trunk to Called Station

A path through the override trunk 116 to the called station 110 is completed by a sequence of relay actuations to effect the cut through of the connection between calling station 111 and called station 110. This sequence of actuations is initiated by the operation of relay 3-ON which closes a normally open contact 3-ON-11 and allows ground to be applied to a 3-ON1 relay, thereby operating it. Operation of the 3-ON relay also closes a normally open contact 3-ON-8, as shown in FIG. 4, and grounds paths SO and ST.

Operations of the 3-ON relay also closes a path through a normally open contact 3-ON-5 in a lead BA, as shown in FIG. 4, to provide a busy tone from a busy tone source 420 to the calling station 111 over the tip and ring leads TO and RO, respectively. A capacitor C3 is included in the busy tone path for DC isolation purposes. In addition, an operate path for a relay 4-CHK is prepared for subsequent closure by closing a normally open contact 3-ON-9.

With the actuation of the relay 3-ON1, as shown in FIG. 3, a flash detect relay 3-X is operated with ground being applied to one side of the 3-X relay via a normally open contact 4-S-8 and a normally closed contact 3-X-8 with the battery potential of −48 volts being applied to the other side of the 3-X relay through a normally open contact 3-ON1-5. Operation of the 3-X relay is held locked through a normally open contact 3-X-8. The operation of the 3-ON1 relay also prepares an operate path for a relay 3-CHKA by closing a normally open contact 3-ON1-1.

Operation of relay 3-ON1 provides a holding ground for relays 3-CT, 3-DA, and 3-AR by closing normally open contacts 3-ON1-7, 3-ON1-4, and 3-ON1-3, respectively. Furthermore, a ground start path for a delay timer τ2 is prepared by closure of a normally open contact 3-ON1-6.

A tip and ring crosspoint connection to the called station 110, as shown in FIG. 4, provides battery to the relay 4-CHK over either a tip lead TT or a ring lead RT through line isolation diodes D-CHK1 or D-CHK2, respectively. The battery path to the relay 4-CHK is completed through a pair of normally closed contacts 3-AR-4 and 4-CHK-5 and normally open contact 3-ON-9 which had been previously closed. A resistor R3, connected across normally closed contact 4-CHK-5, keeps the current flow at a level just sufficient to maintain actuation of the relay 4-CHK following its initial operation. Minimization of the current flow is necessary if the drain on the called station loop is to be kept at a low level. A resistance value for resistor R3 of 19.1 kilohms has been found suitable for this purpose.

In summary, the foregoing relay actuations have prepared a path through the override trunk circuit 116 for completion of an override connection between the calling station 111 and the busy called station 110.

1.7. Calling Station Enables Override

Actual cut through of the calling station 111 to the busy called station 110 occurs in response to a switchhook flash at the calling station 111. When the calling station 111 provides a switchhook flash, the busy tone path BA to the calling station 111 is opened and a 440 Hertz tone is supplied to both the calling station 111 and called station 110. The 440 Hertz tone continues for about three seconds, after which the connection between the calling station 111 and the busy called station 110 is cut through.

Flashing of the switchhook at the calling station 111 causes the supervisory relay 4-S to release which, in turn, removes a shunt ground applied to a relay 3-Y through normally open contact 4-S-8 and normally closed contact 3-Y-5, as shown in FIG. 3. Removal of the shunt ground from relay 3-Y allows it to operate with battery potential being supplied through the normally open contact 3-ON1-5 which was previously closed by operation of the 3-ON1 relay. If the calling station 111 returns to an off-hook condition within approximately 1.2 seconds of depression of the switchhook for a flash, the supervisory relay 4-S reoperates via the held crosspoint connection to the calling station loop. The 1.2 second time interval is controlled by the resistor R6 and the capacitor C8 across the control winding of relay 3-ON. Insertion of resistor R6 and capacitor C8 into the control winding of relay 3-ON is implemented by closure of the normally open contact 4-S-2. The reoperation of relay 4-S causes relay 3-X to be released while relay 3-Y remains in an operated condition.

With relay 3-Y operated a ground path is completed to a relay 3-RBT through normally open contacts 3-ON1-6, 3-Y-2, and 4-CHK-8 and normally closed contacts 3-X-11 and 3-RBT-7. The operation of relay 3-Y also provides a ground to the input of delay timer τ2 and it maintains a release shunt path for relay 3-X by placing a ground potential on both sides of the relay 3-X.

Operation of the relay 3-RBT opens the busy tone path BA to the calling station 111, as shown in FIG. 4, by opening a normally closed contact 3-RBT-1. The ground return path for busy tone comprising a normally open contact 3-ON-4, a normally closed contact 3-RBT-2 and a capacitor C4 is also opened by the opening of a normally closed contact 3-RBT-2. Capacitor C4 provides an AC ground return path and in the preferred embodiment had a value of 0.1 microfarads. At the same time, a 440 Hertz tone, generated by an oscillator 422 and level controlled by an amplifier 423, is transmitted to both the calling station 111 and the called station 110. The 440 Hertz tone applied to the calling station 111 is over a path containing a capacitor C5, a resistor R11, a normally closed contact 3-CT-2, and a pair of normally open contacts 4-CHK-2 and 3-RBT-4. Similarly, the 440 Hertz tone applied to the called station 110 is over a path containing a capacitor C13, a resistor R10, a normally closed contact 3-CT-3, and a pair of normally open contacts 4-CHK-4 and 3-RBT-5. Resistors R10 and R11 and capacitors C5 and C13 provide tone level control and DC isolation, respectively, in the 440 Hertz tone path. In one embodiment the resistors R10 and R11 had values of 10 kilohms and the capacitors C5 and C13 had values of one microfarad.

With the input to the delay timer τ2 grounded by the closure of normally open contact 3-Y-2, as shown in FIG. 3, a ground is supplied to one side of the relay 3-CT through a path containing a transient protection diode D-CT1 and a normally closed contact 3-CT-11. The other side of relay 3-CT is held at battery potential of −48 volts. With the operation of the 3-CT relay, the 440 Hertz tone to the calling station 111 and called station 110 is removed by opening normally closed contacts 3-CT-2 and 3-CT-3 in the 440 Hertz tone path.

It should be noted that the operation of the relay 3-CT is delayed by a fixed time interval, which in one embodiment is approximately three seconds. This threesecond time delay, during which the 440 Hertz tone is supplied to both the calling station 111 and called station 110, gives both stations an adequate warning that call override is to take place. Since the third party connection to the called station 110 is still up, the three-second warning is also supplied to the third party station 112 providing the third party with an indication that his conversation with the called party is about to be overridden. The length of the aforementioned warning time interval is controlled by the delay timer τ2 with resistors R5 and R12 and capacitor C10 providing a fine adjustment of the selected delay. For the three-second warning embodiment R5 had a value of 432 kilohms, R12 had a value of 1.15 megohms and C10 had a value of 2 microfarads.

Following removal of the 440 Hertz tone the calling station 111 and called station 110 are connected together via paths containing coupling capacitors C11 and C12, a pair of normally open contacts 3-CT-5 and 3-CT-7, and a pair of normally closed contacts 3-AR-12 and 3-AR-10, respectively. At this time a talking path is established between the calling station 111 and called station 110 and no further trunk circuit action occurs until either station disconnects.

It should be noted that one other function implemented by the operation of the relay 3-CT is that the slow release loop around the relay 3-ON is broken, thereby decreasing its release time.

1.8. Called Station Goes Idle Subsequent to Enablement of Override

When the calling station 111 initiates a switchhook flash, the call override trunk 116 functions as described at the beginning of Section 1.7 in that the supervisory relay 4-S releases with the relay 3-Y being subsequently operated. In the situation where the called station 110 goes idle subsequent to override enablement the relays 4-CHK and 3-CHKA are released and the relay 3-CT is operated via a path containing normally closed contacts 3-X-10 and 4-CHK-7, and normally open contacts 3-ON1-7 and 3-Y-4. A diode D-CT2 is connected across the winding of the relay 3-CT for protection against transient voltages generated by relay contact closures. An operate lock path for relay 3-CT is provided through normally open contacts 3-ON1-7 and 3-CT-11.

The operation of the relay 3-CT opens the 440 Hertz tone path to prevent tone application prior to ringing the called station 110. With the relay 3-CT operated, ground is applied to an input of a delay timer τ1 through a normally open contact 3-CT-6 and a normally closed contact 3-CHKA-3. Delay timer τ1 regulates the time interval before application of a ringing signal. In one embodiment of the invention this time interval was advantageously selected to be approximately three seconds. Fine adjustment of this delay interval is controlled by a resistor R13 and a capacitor C14 which, for the aforementioned embodiment, had values of 1.5 megohms and 2 microfarads, respectively.

After the three second delay interval, a ground is delivered through a transient protection diode D-AR1 and a normally closed contact 3-AR-11 to one side of the relay 3-AR the other side of which is held at battery potential of −48 volts. An operate lock path for relay 3-AR is provided by normally open contacts 3-ON1-3 and 3-AR-11. A diode D-AR2 is connected across the winding of the relay 3-AR for protection against transient voltages generated by relay contact closures.

With the relay 3-AR operated a ringing signal supplied by a ringing source 421 is applied, as shown in FIG. 4, via a lead RI through a winding of a relay 4-RT and thence through a normally open contact 3-ON-7, a normally closed contact 4-RT-7, and a normally open contact 3-AR-10 to the called station 110. Ground return for the ringing signal by way of a lead RG is through the crosspoint connection of the called station 110 to the override trunk 116 and back through a normally open contact 3-AR-12, a normally closed contact 4-RT-5, and a normally open contact 3-ON-6. Operation of the relay 3-AR also opens the operate path for relay 4-CHK by breaking the normally closed contact 3-AR-4 and provides a ringback tone to the calling station 111 via capacitors C6 and C12 and a pair of normally open contacts 3-RBT-11 and 3-AR-2. Capacitor C6 provides DC isolation and in the described embodiment had a value of 0.04 microfarads.

When the called party answers, a relay 4-RT operates via the called station loop and its operation is locked on a secondary winding through a pair of normally open contacts 4-RT-12 and 3-ON-12. In addition, the operation of the relay 4-RT opens the ringing path to the called station 110 by opening a normally closed contact 4-RT-7 and provides an operate path for a relay 4-D through the station loop and normally open contacts 4-RT-5, 3-AR-12, 4-RT-7, and 3-AR-10.

Actuation of the relay 4-D provides talk battery to the called station 110 and operates the relay 3-DA through a normally open contact 4-D-10 and a normally closed contact 3-DA-9, as shown in FIG. 3. Operation of the relay 3-DA is held locked through normally open contacts 3-DA-9 and 3-ON1-4. The operation of the relay 3-DA completes the tip and ring connection between the calling station 111 and the called station 110. The override trunk 116 remains in this status until the calling station 111 disconnects, at which time relay 4-S releases causing the sequential release of relays 3-ON and 3-ON1. Relays 3-ON and 3-ON1 released open all holding grounds and the circuit is restored to an idle condition.

1.9. Called Station Disconnects After Busy Override and Calling Station Remains Connected To remove the connection between the called station 110 and the third party station 112, following notification of the called station 110 that call override is to take place, the called station 110 goes on-hook briefly. By going on-hook relay 4-CHK releases and the called station 110 goes idle from its prior connection. The release of relay 4-CHK releases relay 3-CHKA which, in turn, causes an input to delay timer $\tau 1$ to be grounded through normally open contact 3-CT-6 and normally closed contact 3-CHKA-3. After approximately three seconds the delay timer $\tau 1$ produces an output which actuates relay 3-AR. As noted previously, the operation of relay 3-AR results in a ringing signal being applied to the called station 110 and a ringback signal being delivered to the calling station 111. When the called station 110 goes off-hook relays 4-RT, 4-D, and 3-DA operate and the connection between the calling station 111 and the called station 110 is established.

The three second delay, as described above, gives the called station 110 a reasonable disconnect interval to remove the third party connection without requiring a ringback signal to be supplied to the called station 110. Any time after the three second interval a ringback signal must be provided to the called station 110 and such a signal is provided by the override trunk circuit 116.

If the calling station 111 goes on-hook during the three second interval, relay 4-S releases initiating a disconnect by releasing relay 3-ON which, in turn, releases relay 3-ON1. Relays 3-ON and 3-ON1 released open all holding grounds and the circuit is restored to an idle condition.

A further advantage of the three second delay is that it allows a previously camped-on connection to the called station 110 to be cut through to the called station 110 when it goes idle. When this occurs relays 4-CHK and 3-CHKA reoperate and the override trunk 116 remains in an override status. Subsequent disconnection of the called station 110 from the camped-on station results in the override trunk 116 supplying a ringback signal to the called station 110 in the manner heretofore described.

1.10. Summary

In summary, circuitry for permitting a calling station 111 equipped with a class of service which allows calls to a busy called station 110 to be overridden has been described. Implementation of call override is instituted by a switchhook flash at the calling station 111 in response to a busy tone from the called station 110. The call override circuitry provides notification to all parties connected to the called station 110 that call override is to be initiated. Should a private connection between the called station 110 and the calling station 111 be desired, the called party can momentarily go on-hook, thereby releasing his connection to the third party station 112. Following this the called party automatically receives a ringback signal if he remains on-hook longer than a predetermined time interval and the calling station 111 continues to remain on the line.

In all cases it is to be understood that the above described embodiment is illustrative of but a small number of many possible specific embodiments which can represent applications of the principles of the invention. Thus, numerous and varied other embodiments can readily be devised in accordance with these principles by those skilled in the art without departing from the spirit and scope of the invention.

What is claimed is:

1. In a telephone switching system having a plurality of line circuits terminated in station sets, said line circuits being interconnectable to a plurality of trunk circuits through a multistage switching network, the invention comprising call override circuitry for completing a connection between a calling station and a called station said called station being busy as a result of a connection to a third station, said call override circuitry comprising
    means for determining a class of service provided to said calling station,
    means for detecting a busy condition of said called station,
    means for providing a through connection path from said calling station to said busy called station, said through path connection means including
    a call override trunk circuit,
    means for seizing said call override trunk circuit provided said calling station has a class of service permitting call override, and
    means for enabling said call override trunk circuit in response to a switchhook flash from said calling station.

2. The telephone switching system in accordance with claim 1 wherein the call override trunk circuit includes
    means for alerting said busy called station for a predetermined time interval that call override is to be effected, and
    means for controlling the duration of said predetermined time interval.

3. The telephone switching system in accordance with claim 2 wherein the call override trunk circuit further includes means for monitoring the status of said called busy station, means for detecting a return to an idle state by said called busy station prior to alerting said called station for said predetermined time interval, means for providing said called station with a ringing signal upon detection of said idle state, and means for completing a through connection to said called station upon response of said called station to said ringing signal.

4. The telephone switching system in accordance with claim 2 wherein the call override trunk circuit includes means for determining a return to an idle condition by said called station following the alerting of said called station that call override is to be effected, and means for applying a ringing signal to said called station after a predetermined time interval provided said through path connection to said called station is maintained by said calling station.

5. The telephone switching system in accordance with claim 1 wherein the call override trunk circuit includes means for alerting said third station for a predetermined time interval that the connection between said third station and said called station is to be overridden, and means for controlling the duration of said predetermined time interval.

6. The telephone switching system in accordance with claim 1 wherein the call override trunk circuit includes means for delaying for a predetermined time interval completion of said through path connection between said calling station and said called station, said interval of time delay allowing any prior camped-on connection to said called station to be completed first, and means for controlling the duration of said predetermined time interval.

7. The telephone switching system in accordance with claim 1 wherein the call override trunk circuit includes means for determining that said calling station has made a request for a call override to a busy called station, and means for denying call override access to said calling station when said called station is busy as a result of a previous camped-on connection.

8. Circuitry for controlling the establishment of call override connections between an entitled calling station and a busy called station, said called station being busy as a result of a connection to a third party station, said circuitry comprising means, responsive to a call from said entitled station to said called station, for detecting a busy condition of said called station, means, subsequently activated by said detecting means and responsive to a switchhook flash from said entitled station, for effecting the establishment of call override connections between said entitled station and said busy station, and means, enabled by said called station, for excluding said third party station from said call override connections.

9. Call override circuitry comprising means for seizing said circuitry in response to a call from an entitled calling station to a busy called station, said called station being busy as a result of a connection to a third party station, means, responsive to a receipt of a switchhook flash from said calling station, for establishing call override connections between said calling station and said called station, and means, enabled by said called station, for excluding said third party station from said call override connections.

10. The call override circuitry in accordance with claim 9 further comprising means, activated by said establishing means, for supplying a call override signal over said established connections to said calling and called stations for a predetermined time interval.

11. The call override circuitry in accordance with claim 10 further comprising means, activated upon termination of said call override signal, for providing a talking path between said calling and called stations.

12. Call override circuitry comprising means for seizing said circuitry in response to a call from an entitled calling station to a busy called station, means, responsive to a receipt of a switchhook flash from said calling station, for establishing call override connections between said calling station and said called station, said call override connections extending connections to another station connected on a prior call to said called station, means, activated by said establishing means, for supplying a call override signal over said call override connections to said calling and called stations for a predetermined time interval, means, responsive to a call disconnect signal from said called station which controls a release of call connections to said other station, for holding said seizure of said call override circuitry and said call override connections to said calling and called stations for a predetermined time interval following said call disconnect signal.

13. The call override circuitry in accordance with claim 12 further comprising means for supplying said call override signal over said extended established connections to said other station for said predetermined time interval.

* * * * *